United States Patent
Eliacin et al.

(10) Patent No.: US 6,714,105 B2
(45) Date of Patent: Mar. 30, 2004

(54) MICRO ELECTRO-MECHANICAL SYSTEM METHOD

(75) Inventors: Manes Eliacin, Buffalo Grove, IL (US); Keryn Lian, Palatine, IL (US); Junhua Liu, Palatine, IL (US); Robert B. Lempkowski, Elk Grove, IL (US)

(73) Assignee: Motorola, Inc.

( * ) Notice: Subject to any disclaimer, the term of this patent is extended or adjusted under 35 U.S.C. 154(b) by 0 days.

(21) Appl. No.: 10/133,913

(22) Filed: Apr. 26, 2002

(65) Prior Publication Data
US 2003/0201852 A1 Oct. 30, 2003

(51) Int. Cl.$^7$ ............................................... H01P 1/10
(52) U.S. Cl. ....................................... 333/262; 200/181
(58) Field of Search ................................. 333/262, 101; 200/181; 335/78, 79, 80

(56) References Cited

U.S. PATENT DOCUMENTS 5,619,061 A * 4/1997 Goldsmith et al. .......... 257/528
6,188,301 B1 * 2/2001 Kornrumpf et al. ........ 333/262

* cited by examiner

*Primary Examiner*—Robert Pascal
*Assistant Examiner*—Dean Takaoka
(74) *Attorney, Agent, or Firm*—Daniel K. Nichols

(57) ABSTRACT

A meso-scale MEMS device having a cantilevered beam is formed using standard printed wiring board and high density interconnect technologies and practices. The beam includes at least some polymer material to constitute its length, and in some embodiments also comprises a conductive material as a load-bearing component thereof. In varying embodiments, the beam is attached at a location proximal to an end thereof, or distal to an end thereof.

34 Claims, 5 Drawing Sheets

MICRO ELECTRO-MECHANICAL SYSTEM METHOD

This invention was made with United States Government support under Agreement No. F33615-00-2-1718 awarded by DARPA. The United States Government has certain rights in the invention.

TECHNICAL FIELD

This invention relates generally to micro electromechanical system (MEMS) methods and apparatus.

BACKGROUND

MEMS devices and apparatus are known in the art. Much work (with few resultant commercial breakthroughs) has been directed at small (a very few microns) systems that typically use semiconductor materials and processing techniques. It has also recently been proposed that printed wiring boards and corresponding fabrication techniques could be utilized to realize meso-scale MEMS structures (on the order of, for example, 25 to 100 microns). For example, U.S. application Ser. No. 09/929,750 as filed on Aug. 14, 2001 by the same assignee as this application describes a Micro-Electro Mechanical System that can be fabricated within the context of a printed wiring board using high density interconnect substrate technology.

One particularly useful structure to consider in this realm comprises a cantilevered beam. Such a structure can be utilized to effect various useful devices including, for example, radio frequency switches, variable capacitors, and so forth. Unfortunately, to date, no acceptable proposals have been made for a way to realize such a mechanism while working at the meso-scale level with organic printed wiring board and high density interconnect substrate technologies.

BRIEF DESCRIPTION OF THE DRAWINGS

This need and others are substantially met through provision of the micro-electro-mechanical system method as disclosed herein. This benefit and others will become more clear upon making a thorough review and study of the following description, and particularly when taken in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, some common elements may not be shown for purposes of retaining focus and clarity.

DETAILED DESCRIPTION

Generally speaking, a post is formed of nonconductive material on a printed wiring board and a beam at least partially formed of polymer material is attached to the post (either proximal to an end of the beam or distal to an end of the beam) such that the beam is cantilevered over the printed wiring board. One or more conductive surfaces can be formed in opposition to one another on the beam and printed wiring board to form capacitor plates, switch closure pads, and other useful mechanisms.

In one embodiment the beam has at least some polymer material over its entire length. In another embodiment at least a portion of the length of the beam is comprised of a non-polymer material, such as a conductor. These elements can be formed using ordinary printed wiring board technologies (including high density interconnect techniques) to realize meso-scale MEMS devices at low cost. Devices such as RF switches and tunable capacitors can be readily and economically formed, including high frequency devices. The embodiments described below will illustrate these methods by depicting construction of various switches such as RF and antenna switches, but it should be borne in mind that such an apparatus is being used for illustrative purposes only and that these methods are not limited in any way to such a device.

Figure 1:
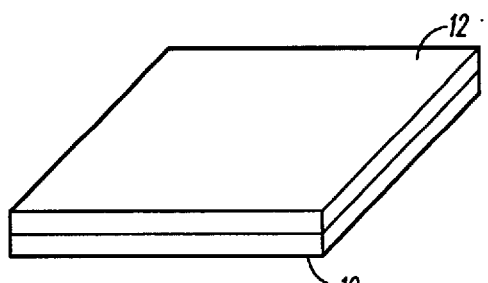
FIGS. 1–4 comprise a series of depictions illustrating a part of a first embodiment.
Figure 2:
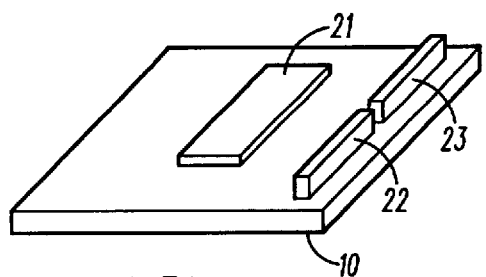
Figure 3:
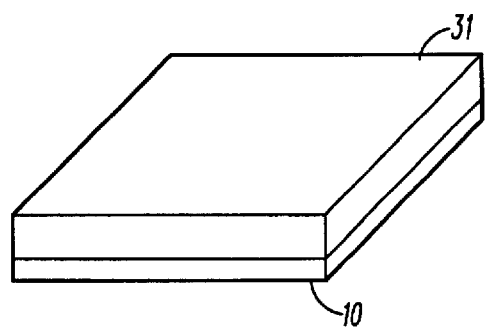
Figure 4:
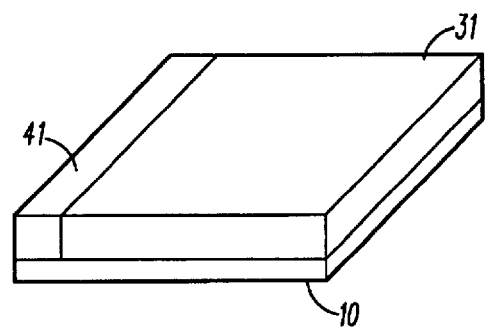

Referring now to the drawings, and in particular to FIG. 1, a printed wiring board having a polymer carrier 10 and a conductive surface 12 can be provided through use of virtually any appropriate material, including FR-2 through FR-6, polyimide, CEM-1 through CEM-8, G-10 (an epoxy/woven glass material), modified epoxies, BT epoxy, cyanate ester, polytetrafluoroethylene (Teflon), and so forth. The conductive surface 12 is printed and etched using conventional printed wiring board techniques to define and create a first capacitive electrode 21 and two conductive traces 22 and 23 that comprise the poles of the RF switch as shown in FIG. 2 (in an actual working embodiment, these traces 22 and 23 would of course couple to other traces and/or devices—such aspects are not shown here for purposes of clarity). If desired, the electrode 21 can be thinned using known techniques to render it at a lower height than the pole traces 22 and 23 (in the alternative, or in combination therewith, the conductive traces can be raised by conventional plating techniques) (this may be useful to ensure that the capacitor electrodes do not contact one another when making the connection between the two pole traces 22 and 23 as will be more evident below) (also, if desired, a thin dielectric coating can be disposed over the electrode 21). With reference to FIG. 3, a sacrificial layer 31 (comprised, for example, of photoimageable resin such as Probelec 81 or possibly photoimageable polyimide) is disposed over the carrier 10 and the conductive elements 21, 22, and 23 with a portion 41 (as shown in FIG. 4) of the resin 31 being exposed to ultraviolet light in accordance with well understood prior art technique to form what will become a nonconductive post when much of the resin 31 is later removed.

Figure 5:
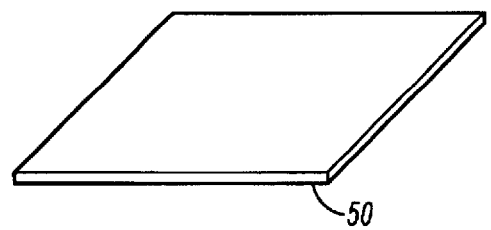
FIGS. 5–12 comprise a series of depictions illustrating an additional part of a first embodiment.
Figure 6:
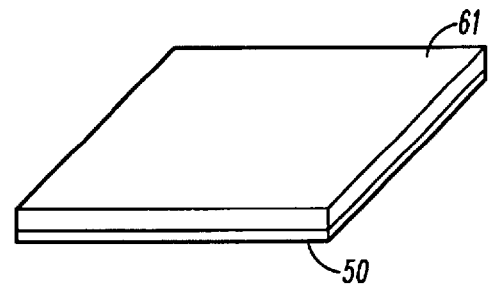
Figure 7:
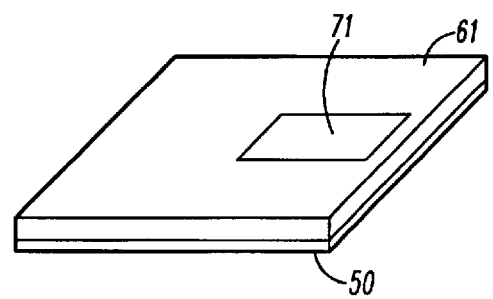
Figure 8:
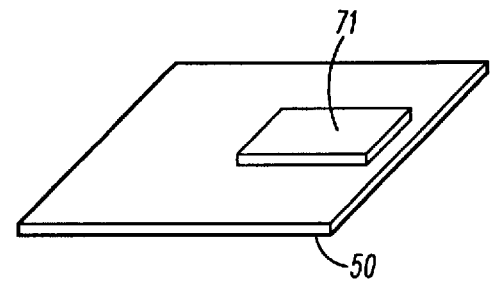

Referring now to FIG. 5, a first way to form a beam will be described. A conductor 50 such as copper foil is coated with a photo-imageable dielectric 61 (such as, for example, Probelec 81) (as shown in FIG. 6). So configured, the conductor 50 serves as a processing host or carrier for the dielectric 61 material. A desired polymer isolator 71 is photoimaged in the dielectric 61 as shown in FIG. 7 and the remaining dielectric material removed as shown in FIG. 8 to leave only the polymer isolator 71. (This polymer isolator 71 can also be formed by screen-printing a non-photoimageable resin through an appropriate polyester or stainless steel mesh screening material). This polymer isolator 71, as will be evident below, serves as a structural part of the length of a resultant beam and further serves to electrically isolate a capacitor electrode on the beam from a contact bar located elsewhere on the photoimageable beam.

Figure 9:
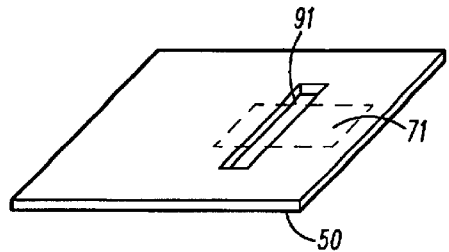
Figure 10:
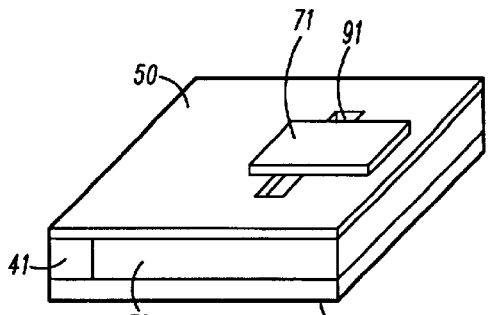

With reference to FIG. 9, wherein the conductor 50 is shown upside down as compared with FIGS. 5 through 8, a slot 91 is imaged and etched through the conductor 50 and opposite the polymer isolator 71 in a location where a space is appropriate to better ensure electrical isolation between the capacitor electrode (not yet shown) and the contact bar (also not yet shown). This conductor 50/polymer isolator 71 combination is then disposed over and laminated, conductor 50 side down, to the resin 31 surface assembly of FIG. 4 as shown in FIG. 10. (If desired, precise alignment of the two assemblies can be assured through use of known registration techniques, including but not limited to use of registration through-holes.) So configured, the polymer isolator 71 is located over the capacitor electrode 21 and the pole traces 22 and 23 as originally formed on the polymer carrier 10 and as are, at this point in the process, disposed within the resin 31.

Figure 11:
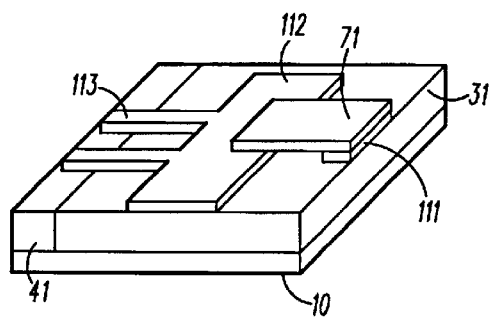

Conventional printing, etching, and striping steps are then used to define and form, from the conductor 50, a capacitor electrode 112, a contact bar 111, and one or more beam elements 113 that couple, in this embodiment, the capacitor electrode 112 to the post 31. If desired, the conductor 50 can be thinned prior to these steps to provide a suitably thin material (thin material, particularly in the beam area 113, will typically be desired to ensure easy movement of the beam with respect to the post 41). As shown in FIG. 11, the polymer isolator 71 physically couples the capacitor electrode 112 and the contact bar 111 and therefore comprises a part of the overall length of the beam that extends from the post 41 to the contact bar 111. It can also be seen that this same polymer isolator 71 electrically isolates the capacitor electrode 112 from the contact bar 111.

Figure 12:
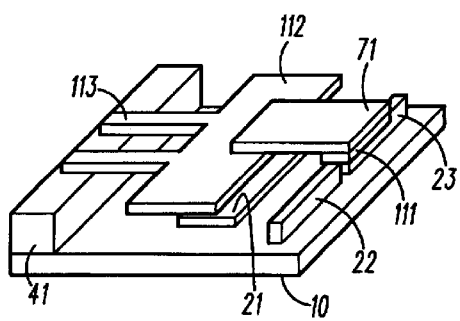

The overall structure is then heated to polymerize the post 41, and the remaining sacrificial resin 31 is then removed using conventional techniques to yield the structure shown in FIG. 12. In this embodiment, the resultant structure has a nonconductive post 41 that supports a beam comprised of both conductive portions (113 and 112) and a polymer portion 71. This beam is cantilevered out over the printed wiring board such that the capacitor electrode 112 on the beam is disposed substantially opposite the capacitor electrode 21 on the carrier 10 and the contact bar 111 on the beam is disposed substantially opposite the pole traces 22 and 23 on the carrier 10. So configured, the capacitor can be controlled (via control lines that are not shown for purposes of more clearly showing the above structure) to cause the beam to flex towards the carrier 10 and hence to bring the contact bar 111 into bridging contact between the two pole traces 22 and 23 to thereby make switch closure. Similarly, the above can be reversed to move the beam away from the carrier 10 and thereby break the switch contact.

Devices such as the one described above can be readily formed, using known techniques as referenced, on a scale of 25 to 50 microns or larger. This is larger than traditional silicon-based MEMS scale devices, but still very small (and very inexpensive) in comparison to other discrete components that can be replaced by such an approach. Devices made in accordance with the above have also proven to be resilient and robust through large numbers of flexing events. Furthermore, and particularly when used to form an RF switch as above, high frequency signals can be well accommodated with excellent isolation as between the RF signals and the DC control signals.

Figure 13:
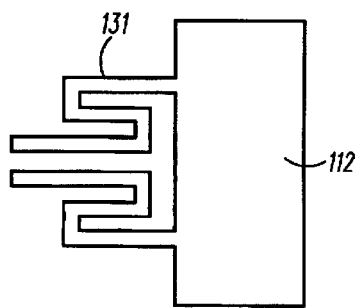
FIG. 13 comprises a detailed top plan view of an illustrative alternative embodiment.

As described above, the beam includes 2 narrow linear portions of conductive material as depicted by reference numeral 113. Other alternatives are available. For example, only a single linear portion might be effective for some applications whereas other applications might benefit from three or more such linear portions. With reference to FIG. 13, non-linear portions 131 can also be used. In fact, due to the increased resiliency provided, a preferred embodiment will likely include one or more such non-linear portions. As depicted, a relatively simple non-linear serpentine pattern can be used. Other patterns can of course be considered as well, including patterns formed within three or more independent beam segments.

Figure 14:
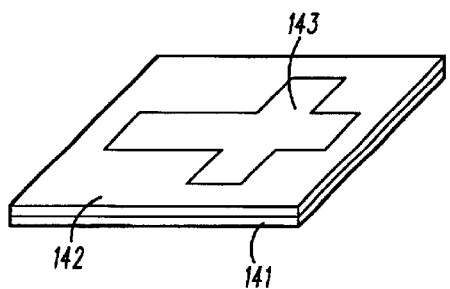
FIGS. 14–17 comprise a series of depictions illustrating a second embodiment.
Figure 15:
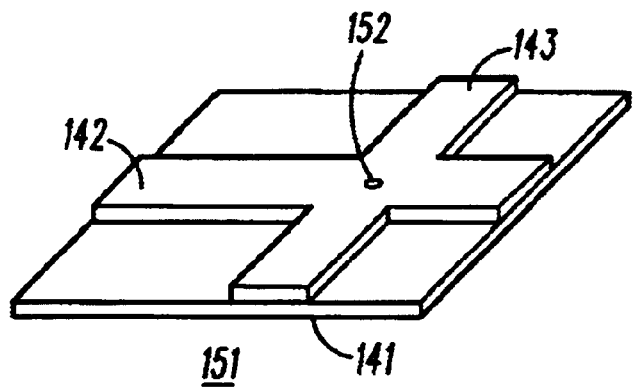

The above embodiments utilize a conductor for a portion of the length of the resultant beam. If desired, the beam can be structurally comprised, for its entire length, of polymer material. For example, with reference to FIG. 14, a photoimageable dielectric 142 is coated over a processing host comprising a conductor 141 (again, in this embodiment, a copper foil) and standard processing techniques utilized to define a beam area 143. The surrounding polymer material 142 is removed to form a resultant beam 151 as depicted in FIG. 15 that is comprised, at this point, of both the polymer material 142 and the conductor 141. A via 152 can also be etched or drilled (this via will eventually provide an electrical connection between a capacitor plate to be formed on the beam 151 and the conductor on the opposing side of the beam 151). Only one via 152 is shown, but of course additional vias could be used as appropriate to the application.

Figure 16:
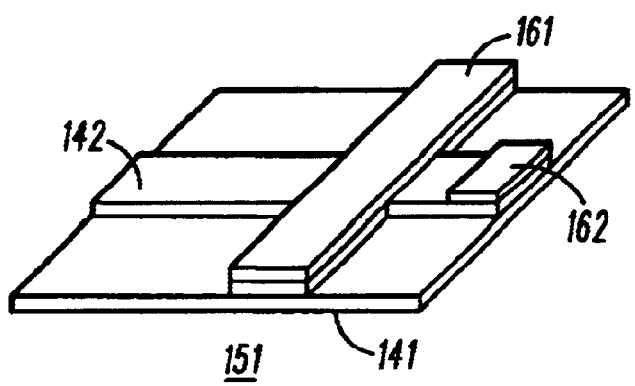

Referring to FIG. 16, conductive material is selectively deposited on the beam 151 to form a capacitor plate 161 and a contact bar 162. In the alternative, conductive material can be plated over all or most of the beam 151 and then selectively removed to form these features. Lamination as described above with respect to FIG. 10 is then carried out.

Figure 17:
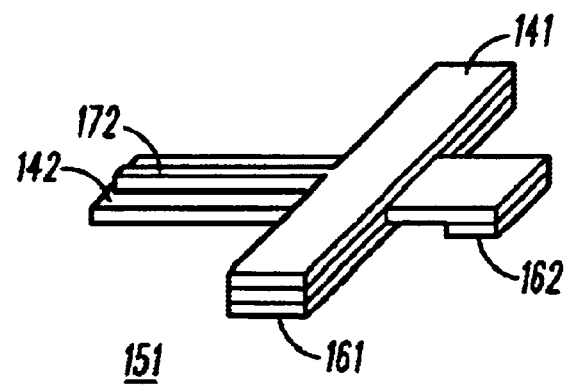

Referring now to FIG. 17, and looking at the opposite side of the beam 151, the original conductor material 141 is imaged and etched to form a control surface and a control line 172. The latter will allow for DC control voltage to be applied to the capacitor electrode 161 and hence facilitate control of the beam 151 as described above to make and break switch connections with the contact bar 162 once the beam 151 has been affixed to a post as described above. For example, the beam 151 can be affixed and cantilevered as described above with respect to FIG. 12.

So configured, a beam consisting of polymer material for its entire length can be realized as may be useful for some applications.

Figure 18:
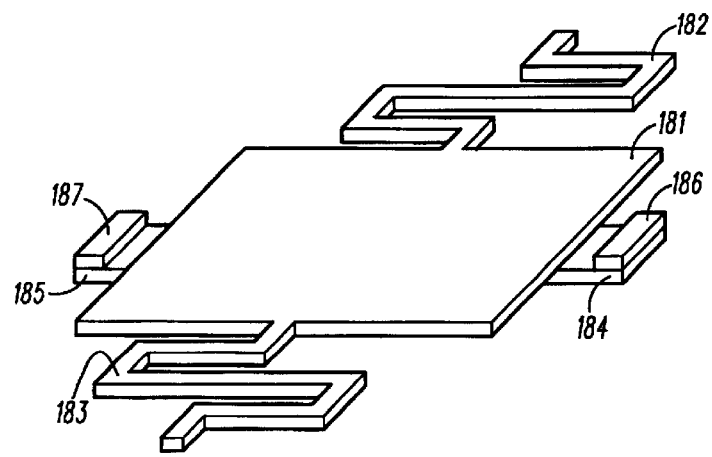
FIGS. 18–22 comprise a series of depictions illustrating yet another embodiment.

Referring now to FIG. 18, yet another exemplary embodiment comprising a single pole double throw switch will be described. As described above, a beam structure can be formed using laminate methodologies. In this embodiment, the beam includes a body portion 181 having extensions 184 and 185 disposed on either end thereof. The body portion 181 itself, in this embodiment, is usefully comprised of a conductor such as copper and may have a length of approximately 100 mils, a width of approximately 60 mils, and a thickness of approximately 0.8 mils. The extensions 184 and 185 may be comprised of polymer material and may have a width of approximately 20 mils and extend approximately 20 mils or so beyond the end of the body portion 181. A conductor 186 and 187 (such as copper) is disposed on each of the extensions 184 and 185 to serve as a switch contact surface as explained below in more detail.

The body portion 181 in this embodiment also includes two torsional pivot members 182 and 183 extending laterally therefrom. These torsional pivot members 182 and 183 are comprised in this embodiment of the same material as the body portion 181 itself and in fact are integral therewith. As will be explained below in more detail, these torsional pivot members 182 and 183 serve to mechanically bias the beam towards a particular orientation. At the same time, however, response time, required actuation voltage, and other design criteria of interest are well served if this bias is not overwhelmingly powerful. Therefore, in a preferred embodiment, to distribute the torsional force over a relatively large area, each of the torsional pivot members 182 and 183 are shaped in a serpentine configuration. Such a configuration is particularly advantageous in part because the overall stiffness factor for the resultant member can be readily adjusted by varying any of the length, width, and thickness thereof. Other configurations that serve the same end could of course be utilized as well if desired and as appropriate to a given application.

Figure 19:
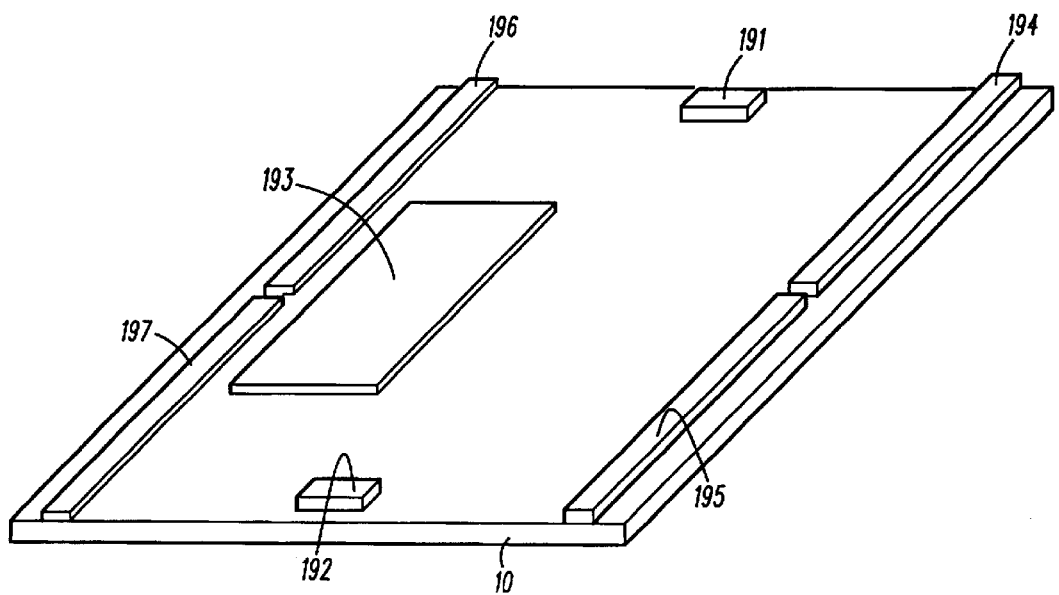

Referring now to FIG. 19, this embodiment also provides for a printed wiring board 10 having various features that overlie the printed wiring board 10. In particular, a conductive control surface 193 is disposed in a location where it will be appropriately placed to attract and thereby influence the beam as described below in more detail. This embodiment also includes two posts 191 and 192 comprised of nonconductive polymer material and two pairs of conductive traces 196/197 and 194/195, which pairs each include a continuity break such that a current cannot flow therethrough. One of the conductive trace pairs 194/195 is relatively thick (having a thickness of, for example, approximately 2.0 mils) whereas the remaining pair of conductive traces 196/197 is relatively thin (having a thickness of, for example, approximately 1.0 mil). The purpose of this difference in thickness will be made more clear below. (It should be noted that there are other ways that this disparity in height could be accomplished. For example, the conductive traces could be of equal thickness but one could be disposed atop a raised section of nonconductive material.)

Figure 20:
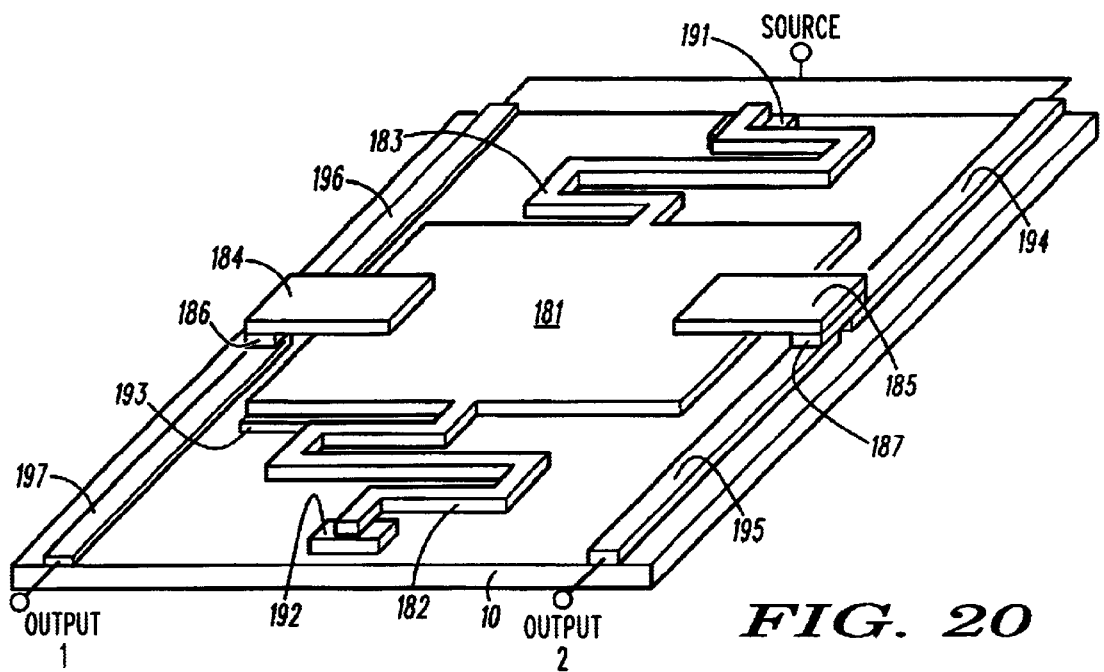

Referring now to FIG. 20, the beam structure as depicted in FIG. 18 is inverted and disposed on the printed wiring board structure as depicted in FIG. 19 such that the nonconductive posts 191 and 192 support the ends of the two torsional pivot members 182 and 183 (the posts and pivot members are, in a preferred embodiment, attached to one another using appropriate lamination techniques or other suitable fixation and/or captivation methodologies). So configured, the beam is disposed and cantilevered in two directions over the printed wiring board with respect to the pivot axis thereby formed.

Figure 21:
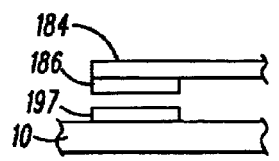
Figure 22:
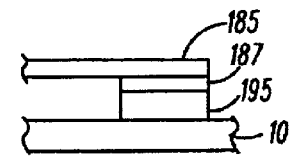

More particularly, the conductive control surface 193 is disposed underneath the body portion 181 of the beam with a gap of about 0.8 mils therebetween. In addition, one of the switch contact surfaces 187 is disposed over the continuity break in one pair of the conductive traces and is further in physical and electrical contact with the traces 194 and 195 that comprise this conductive trace pair (such positioning is perhaps better viewed with reference to FIG. 22). By so bridging the continuity break, a current can readily flow from one trace 194 to the other trace 195. Conversely, while the remaining switch contact surface 186 is also disposed over the continuity break as corresponds to the remaining conductive trace pair 196 and 197, this remaining switch contact surface 186 is not in physical contact with the conductive traces 196 and 197 themselves because the conductive traces 196 and 197 are relatively thin. In this embodiment, the conductive surfaces are separated from one another by approximately 0.8 mils. Hence the switch contact surface 186 does not bridge the continuity break at this time (as perhaps more readily viewed with reference to FIG. 21). Consequently, this latter conductive trace pair 196/197 represents an open circuit.

So configured, in a first mode of operation when the conductive control surface 193 is not energized and the device is therefore essentially at rest, the torsional pivot members 182 and 183 will urge the beam to pivot towards the right (as viewed in these diagrams) such that the first pair of conductive traces 194/195 will have their continuity break bridged by the corresponding switch contact surface 187.

Conversely, in a second mode of operation when the conductive control surface 193 is energized, the control surface 193 will attract the body portion 181 of the beam and thereby cause the beam to act against the mechanical torsion of the torsional pivot members 182 and 183 and pivot until the opposing continuity break has been bridged by the corresponding switch contact surface 186. At the same time, the first switch contact surface 187 will be removed from physical contact with its corresponding conductive traces 194 and 195, thereby opening that continuity break.

Figure 23:
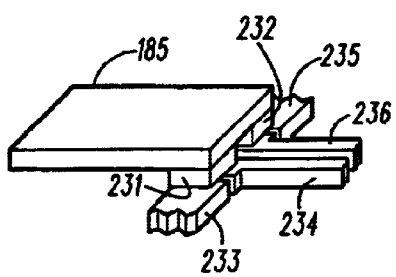
FIG. 23 comprises a perspective detailed view of yet another embodiment.

So configured, a single pole double throw switch is achieved when a source signal is provided to two of the conductive traces 194 and 196 and the remaining conductive traces 195 and 197 are each coupled to separate outputs. This switch could be used, for example, as an antenna switch to allow an antenna to be selectively switched between a transmitter and a receiver. These same basic concepts can of course be utilized to configure other switches as well. For example, the above switch could be modified as depicted in FIG. 23 such that two switch contact surfaces 231 and 232 are positioned on a common part of the beam to thereby bridge a first pair of conductive traces 233 and 234 and a second pair of conductive traces 235 and 236, respectively. A double pole double throw switch is readily achieved in this manner. It is also possible to utilize these teachings to configure switches having alternative symmetries. For example, if desired, a switch could be formed with bilateral symmetry, such that the switch is substantially identical on both sides of the pivoting beam. So configured, a switch having three states (off-off, on-off, and off-on) could be readily provided.

Those skilled in the art will recognize that various alterations, modifications, and combinations can be made with respect to the various embodiments described above. For example, numerous other devices other than the RF switch as described can be formed using the cantilevered beam so formed, including, for example, a variable capacitor. Such alterations, modifications, and combinations are not to be viewed as being outside the appropriate scope of the invention.

We claim:
1. A method comprising:
   providing a printed wiring board comprised at least in part of polymer material;
   forming a nonconductive post on the printed wiring board;
   forming a beam at least partially of polymer material;
   attaching the beam to the nonconductive post such that the beam is cantilevered over the printed wiring board.
2. The method of claim 1 and further comprising forming at least one open signal trace on the printed wiring board.
3. The method of claim 2 wherein forming a beam at least partially of polymer material includes forming a beam at least partially of polymer material and which includes a conductive portion.
4. The method of claim 3 wherein attaching the beam to the nonconductive post such that the beam is cantilevered over the printed wiring board includes attaching the beam to the nonconductive post such that the beam is cantilevered over the printed wiring board and such that the conductive portion of the beam is disposed opposite the open signal trace on the printed wiring board.

5. The method of claim 1 and further comprising forming a conductive surface on the printed wiring board and wherein:
   forming a beam at least partially of polymer material includes forming a beam at least partially of polymer material and which includes a conductive portion; and
   attaching the beam to the nonconductive post such that the beam is cantilevered over the printed wiring board includes attaching the beam to the nonconductive post such that the beam is cantilevered over the printed wiring board and such that the conductive portion of the beam is disposed substantially opposite the conductive surface on the printed wiring board.

6. The method of claim 1 and further comprising forming a first conductive surface and a second conductive surface on the printed wiring board and wherein:
   forming a beam at least partially of polymer material includes forming a beam at least partially of polymer material and which includes a first conductive portion and a second conductive portion; and
   attaching the beam to the nonconductive post such that the beam is cantilevered over the printed wiring board includes attaching the beam to the nonconductive post such that the beam is cantilevered over the printed wiring board and such that the first conductive portion of the beam is disposed substantially opposite the first conductive surface on the printed wiring board and the second conductive portion of the beam is disposed substantially opposite the second conductive surface on the printed wiring board.

7. The method of claim 1 wherein forming a beam at least partially of polymer material includes forming a beam that has a length that includes a contiguous section of polymer material.

8. The method of claim 1 wherein forming a beam that has a length that includes a contiguous section of polymer material includes forming a beam that has a length that includes a contiguous section of polymer material and a conductive material disposed from proximal a first end of the beam and extending at least partially along the length of the beam.

9. The method of claim 1 wherein forming a beam at least partially of polymer material includes forming a beam that has a length wherein a portion of the length includes the polymer material and a portion of the length is comprised of a different material.

10. The method of claim 9 and wherein forming a beam that has a length wherein a portion of the length includes the polymer material and a portion of the length is comprised of a different material includes forming a beam that has a length wherein a portion of the length includes the polymer material and a portion of the length is comprised of a conductive metal.

11. The method of claim 10 wherein forming a beam having a portion of its length comprised of a conductive metal includes forming a beam having a portion of its length comprised of a plurality of conductive metal beams.

12. The method of claim 11 wherein forming a beam having a portion of its length comprised of a plurality of conductive metal beams includes forming a beam having a portion of its length comprised of a plurality of conductive metal beams wherein at least one of the conductive metal beams has at least a portion thereof shaped in a nonlinear manner.

13. The method of claim 1 wherein attaching the beam to the nonconductive post includes attaching the beam proximal to an end of the beam to the nonconductive post.

14. The method of claim 1 wherein attaching the beam to the nonconductive post includes attaching the beam distal to an end of the beam to the nonconductive post.

15. The method of claim 14 wherein forming a beam includes forming a beam having at least one torsional pivot member.

16. The method of claim 15 wherein forming a beam having at least one torsional pivot member includes forming a beam having at least one torsional pivot member wherein at least a portion of the torsional pivot member has a serpentine shape.

17. The method of claim 15 wherein forming a nonconductive post includes forming at least two nonconductive posts overlying the printed wiring board.

18. The method of claim 17 wherein attaching the beam to the nonconductive post includes attaching the beam to at least two of the at least two nonconductive posts.

19. A method of forming an organic micro electromechanical system apparatus comprising:
   providing a printed wiring board comprised at least in part of polymer material;
   depositing a polymer material on the printed wiring board;
   partially curing a first portion of the polymer material on the printed wiring board;
   etching at least some uncured portions of the polymer material on the printed wiring board to form a nonconductive post on the printed wiring board;
   forming a beam at least partially of polymer material;
   attaching the beam to the nonconductive post such that the beam is cantilevered over the printed wiring board.

20. The method of claim 19 and further comprising forming at least one open signal trace on the printed wiring board and wherein:
   forming a beam at least partially of polymer material includes forming a beam at least partially of polymer material and which includes a conductive portion; and
   attaching the beam to the nonconductive post such that the beam is cantilevered over the printed wiring board includes attaching the beam to the nonconductive post such that the beam is cantilevered over the printed wiring board and such that the conductive portion of the beam is disposed opposite the open signal trace on the printed wiring board.

21. The method of claim 19 and further comprising:
   depositing a conductor on the printed wiring board; and
   etching at least some of the conductor to thereby form a conductive surface area on the printed wiring board;
   and wherein:
   forming a beam at least partially of polymer material includes forming a beam at least partially of polymer material and which includes a conductive portion; and
   attaching the beam to the nonconductive post such that the beam is cantilevered over the printed wiring board includes attaching the beam to the nonconductive post such that the beam is cantilevered over the printed wiring board and such that the conductive portion of the beam is disposed substantially opposite the conductive surface area on the printed wiring board.

22. A method of forming an organic micro electromechanical system apparatus comprising:

providing a printed wiring board comprised at least in part of polymer material;

forming a nonconductive post on the printed wiring board;

providing a conductive metal carrier;

coating at least a portion of the conductive metal carrier with a polymer;

curing at least a portion of the polymer on the conductive metal carrier to define at least a portion of a beam;

etching at least a portion of the polymer away from the conductive metal carrier to form a beam that is comprised at least in part of the polymer;

attaching the beam to the nonconductive post;

removing at least some of the polymer such that the beam is cantilevered over the printed wiring board.

23. The method of claim 22 wherein curing at least a portion of the polymer on the conductive metal carrier to define at least a portion of a beam includes curing at least a portion of the polymer on the conductive metal carrier to define the beam.

24. The method of claim 23 and further comprising:
depositing conductive metal on at least a portion of the polymer on the conductive metal carrier.

25. The method of claim 24 and further comprising:
forming at least one conductive via through the beam to electrically connect at least a portion of the deposited conductive metal to at least a portion of the conductive metal carrier.

26. The method of claim 24 and further comprising:
etching a portion of the conductive metal carrier away to leave only a portion of the conductive metal carrier on the beam.

27. The method of claim 26 wherein the step of attaching the beam to the nonconductive post such that the beam is cantilevered over the printed wiring board includes attaching the beam to the nonconductive post such that the beam is cantilevered over the printed wiring board and such that the portion of the conductive metal carrier that is on the beam is oriented away from the printed wiring board.

28. The method of claim 26 wherein the step of attaching the beam to the nonconductive post such that the beam is cantilevered over the printed wiring board includes attaching the beam to the nonconductive post such that the beam is cantilevered over the printed wiring board and such that the portion of the conductive metal carrier that is on the beam is oriented towards the printed wiring board.

29. The method of claim 22 wherein curing at least a portion of the polymer on the conductive metal carrier to define at least a portion of a beam includes curing at least a portion of the polymer on the conductive metal carrier to provide cured polymer that defines only a part of the beam.

30. The method of claim 29 and further comprising removing a portion of the conductive metal carrier proximal to the cured polymer.

31. The method of claim 30 and further comprising etching the conductive metal carrier to thereby form a remaining portion of the beam.

32. The method of claim 31 wherein attaching the beam to the nonconductive post such that the beam is cantilevered over the printed wiring board includes attaching the remaining portion of the beam comprised of the conductive metal carrier to the nonconductive post such that a portion of the beam including the cured polymer is cantilevered over the printed wiring board.

33. A meso-scale switch comprising:

a printed wiring board comprised at least in part of polymer material;

at least two nonconductive posts disposed overlying the printed wiring board;

a conductive control surface disposed overlying the printed wiring board;

a plurality of conductive traces disposed overlying the printed wiring board, wherein at least two of the conductive traces have a continuity break;

a beam comprising:
a body having a first and second torsional pivot disposed on either side thereof, with the first torsional pivot being disposed atop one of the nonconductive posts and the second torsional pivot being disposed atop another of the nonconductive posts;
a first conductive portion disposed at least partially opposite the conductive control surface;
a second conductive portion disposed at least partially opposite the continuity break in a first one of the conductive traces; and
a third conductive portion disposed at least partially opposite the continuity break in a second one of the conductive traces;

wherein the first and second torsional pivots bias the beam such that:
at rest when the conductive control surface is not energized, the second conductive portion physically and electrically bridges the continuity break in the first one of the conductive traces and the third conductive portion does not physically and electrically bridge the continuity break in the second one of the conductive traces; and
when the conductive control surface is energized, the third conductive portion physically and electrically bridges the continuity break in the second one of the conductive traces and the second conductive portion does not physically and electrically bridge the continuity break in the first one of the conductive traces.

34. The meso-scale switch of claim 33 wherein at least a portion of the first and second torsional pivots have a serpentine shape.

* * * * *